March 10, 1931.  L. W. BROWNE  1,795,288
AIR BLOCK PILOT CONTROL
Filed Feb. 13, 1929    2 Sheets-Sheet 2
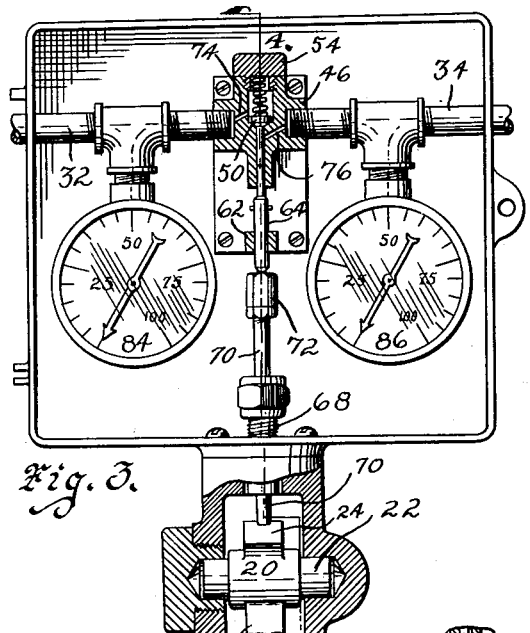
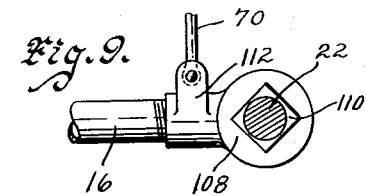
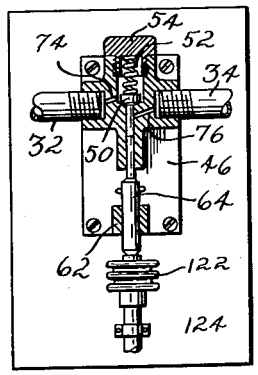
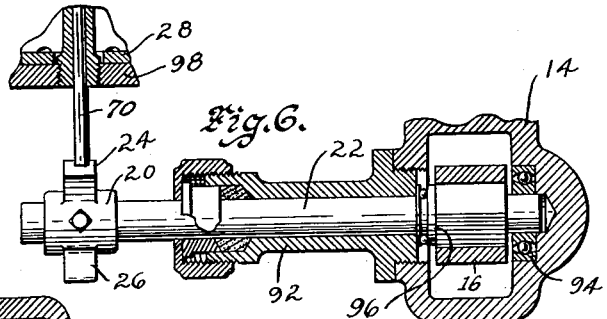
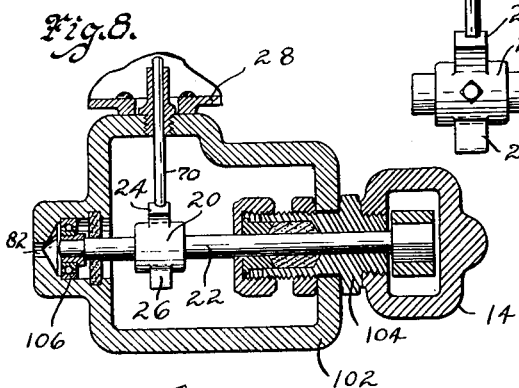
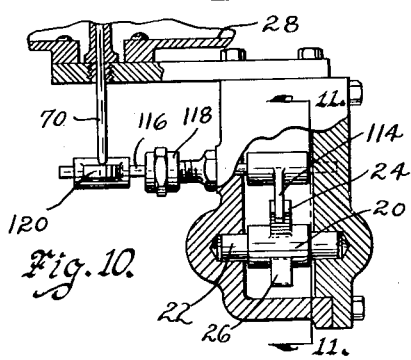
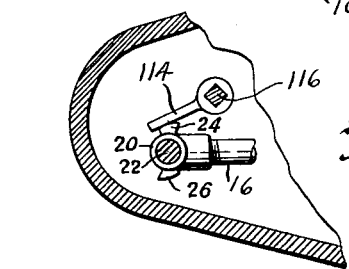
Inventor
Lyle W. Browne
by Bair, Freeman & Sinclair
Attorneys
Witness
Orval Floden Patented Mar. 10, 1931

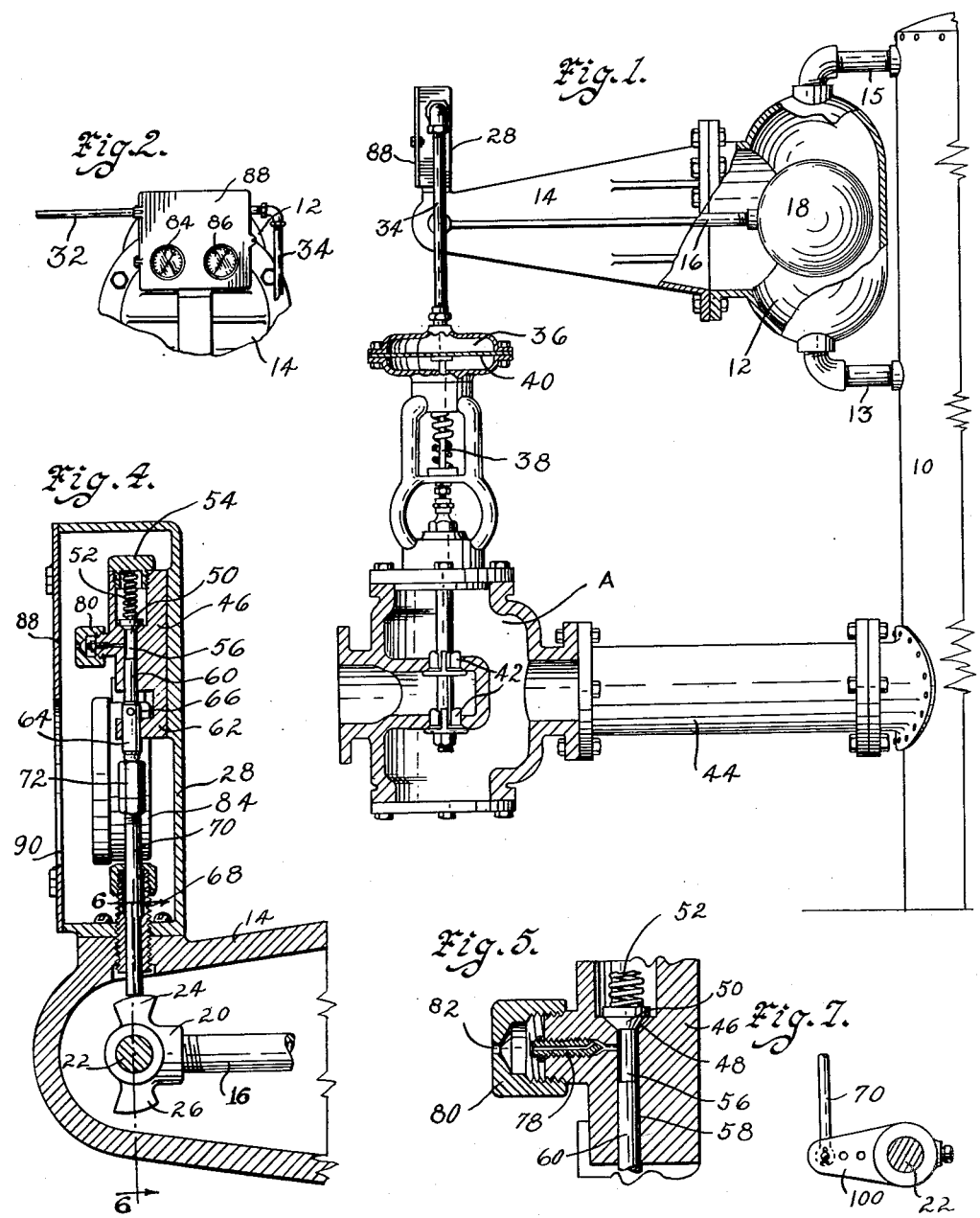

1,795,288

UNITED STATES PATENT OFFICE

LYLE W. BROWNE, OF MARSHALLTOWN, IOWA, ASSIGNOR TO THE FISHER GOVERNOR COMPANY, OF MARSHALLTOWN, IOWA

AIR BLOCK PILOT CONTROL

Application filed February 13, 1929. Serial No. 339,621.

The object of my invention is to provide an air block pilot control of simple, durable and comparatively inexpensive construction.

A further object of my invention is to provide an air block pilot control especially adapted for operating a pressure actuated valve by controlling the admission of a gas under pressure such as compressed air to the pressure actuated value.

Still a further object is to provide float means for operating the air block pilot control.

More particularly it is my object to provide an air block pilot control comprising a pilot valve adapted to control the admission of compressed air to a pressure actuated valve, the air block pilot control being associated with a float cage and operatively connected with a float arm of a float within said cage.

Still a further object is to provide various novel mechanisms for operatively connecting the float with the pilot valve.

Still a further object is to provide the pilot valve of such construction that it may be used with operating devices other than float controlled mechanisms.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side elevation of a tank structure with a float cage secured thereto, my improved type of air block pilot valve being associated with the float cage and connected with a pressure actuated valve adapted to control the flow of fluid relative to the tank.

Figure 2 is a front view of my air block pilot control showing the lid thereon in closed position.

Figure 3 is an enlarged view of the air block pilot control showing the lid removed and the pilot valve in section, the portion of the float cage to which the air block pilot control is attached also being in section.

Figure 4 is a vertical sectional view on the line 4—4 of Figure 3.

Figure 5 is an enlarged sectional view of a portion of Figure 4 illustrating an adjustable leak used in connection with the pilot valve.

Figure 6 is a sectional view such as might be taken on the line 6—6 of Figure 4, showing a modified form of construction in which the air block pilot control is actuated by a cam outside of the float cage instead of one on the inside thereof.

Figure 7 shows a modification of Figure 6 in which a short lever is used instead of a cam for actuating the pilot valve pin.

Figure 8 shows a sectional view similar to Figure 6 illustrating a modified form of mounting for the air block pilot control.

Figure 9 illustrates a modified type of connection between the float arm and the pilot valve of the air block pilot control.

Figure 10 is a view similar to Figure 6 showing still another type of operative connection between the float arm and the air block pilot control.

Figure 11 is a sectional view on the line 11—11 of Figure 10; and

Figure 12 shows a bellows arrangement for operating the air block pilot control.

First of all I will describe one way in which my air block pilot control may be operatively connected with a pressure actuated valve for automatically operating the same depending on the level of a liquid within a tank. The tank is indicated at 10 and a float cage 12 is connected therewith by means of pipes 13 and 15. The float cage 12 extends away from the tank as indicated by the portion 14 and this portion houses a swingably mounted float arm 16.

A ball float 18 of suitable construction, is mounted on the inner end of the float arm 16 and within the float cage 12. The float arm 16 as shown in Figures 3 and 4, has its outer end threaded into a fitting 20. The fitting 20 is pivoted on a pivot pin 22.

Cam members 24 and 26 are formed on the fitting 20 in diametrical opposite positions. The air block pilot control consists of a casing 28 containing various parts hereinafter to be more specifically referred to and this casing rests upon and is secured to the portion 14 of the float cage. An inlet pipe 32 extends into the casing 28 and an outlet pipe 34 extends from the opposite side thereof.

The outlet pipe 34 is connected with a diaphragm chamber 36 of a valve structure A of the pressure actuated type. A valve stem 38 is adapted to be actuated by the diaphragm 40 within the diaphragm chamber 36 for opening the valve members 42, when pressure is exerted upon the diaphragm. The valve structure A is connected with the tank 10 by means of a pipe 44.

The air block pilot control consists of a pilot valve including a body portion 46 mounted within the casing 28. The body portion 46 is adapted to have the inlet and outlet pipes 32 and 34 connected therewith as clearly shown in Figure 3. Formed in the body portion 46 is a valve seat 48. A valve member 50 normally coacts therewith and such coaction is caused by a spring 52. The spring 52 extends between the valve member 50 and a removable cap or plug 54.

The valve member 50 is provided with a stem 56 extending through a bore 58 in the body member 46. A second pin 60 is mounted within the bore 58 and contacts with the lower end of the pin 56. The pin 60 fits the bore 58 quite snugly but the pin 56 is rather loose therein as shown by the shaded lines along the sides of the pin 56.

The perforated ear 62 is provided on the body portion 46 and a pin 64 extends slidably therethrough. A pin 66 is carried by the pin 64 to act as a stop. At the bottom of the casing 28, a sleeve and packing gland 68 is provided.

A pin 70 is slidably mounted through the sleeve and packing gland 68. The upper end of the pin 70 is provided with an adjustable head 72 whereby the effective length of the pin 70 may be adjusted. The lower end of the pin 70 rests on the cam 24.

Referring to Figure 3, it will be noted that a passageway 74 extends from the inlet pipe 32 to the interior of the body portion 46 above the valve member 50. A passageway 76 extends from the outlet pipe 34 to a point below the valve member 50. Thus it will be seen that the valve member 50 when against the valve seat 48, serves to cut-off the supply of a gas under pressure such as compressed air from the inlet pipe 32 to the outlet pipe 34. Air may be admitted from one pipe to the other however, by raising the valve member 50 from the valve seat 48.

As best shown in Figure 5 a leak screw 78 is provided in the body portion 46 and communicates with the pilot valve below the valve member 50. The leak screw 78 has its inner end pointed and adjustable relative to a cone seat so that the amount of leakage may be adjusted. A cap 80 is provided for the leak screw 78 and has an opening 82 through which air may leak to the atmosphere.

The inlet pipes 32 and 34 are provided with gauges 84 and 86 respectively, whereby the operation of the pilot valve may be determined. The casing 28 is provided with a cover 88 having openings 90 through which the faces of the gauges 84 and 86 may be viewed.

In Figure 6 I have illustrated a modified form of construction in which the pivot pin 22 extends outwardly through a sleeve and packing gland 92 secured to the portion 14 of the float cage. The fitting 20 with its cams 24 and 26 are mounted outside of the casing 14. The bearings for the pin 22 may be of plain type such as shown in Figure 3 or a radial ball bearing 94 and a thrust ball bearing 96 may be utilized.

The air block pilot control casing 28 may be supported on an arm 98 extending to the casing 14 and connected therewith in a manner similar to that shown in Figure 10. Referring to Figure 7, an arm or lever 100 may be secured to the pivot pin 22 and the pilot valve pin 70 may be pivotally connected with such lever instead of using a cam construction.

In Figure 8 still another modified form of mounting for the pivot pin 22 and air block pilot control casing 28 is shown. In this instance, a frame 102 is provided in connection with a sleeve and stuffing box member 104. A combination radial and thrust ball bearing 106 is carried by the frame 102 for providing a bearing for the outer end of the float arm pivot pin 22.

The casing 28 is carried by the frame 102. In Figure 9, a construction is illustrated whereby the pilot valve pin 70 is directly connected with a fitting 108 adapted to receive a squared portion 110 of the float arm pivot pin 22. The fitting 108 has the float arm 16 screw threaded into a boss thereon.

The pilot valve pin 70 is pivoted to an ear 112 formed on the fitting 108. Two of the ears 112 may be provided so that the pin 70 may be mounted between them. In Figures 10 and 11 I have illustrated a modified form of construction in which the cam 24 coacts with a lever 114. The lever 114 is secured to a pivot pin 116 extending out of the casing 14 through a stuffing box 118. A second lever 120 is secured to the pin 116 on the outside of the casing 14 and the lower end of the pilot valve pin 70 rests on the arm 120 whereby upward movement thereof is imparted to the pin 70.

Figure 12 illustrates a way of mounting the pilot valve structure to be operated by a pressure actuated bellows 122. A baseboard 124 may be provided to which the pilot valve structure and the bellows 122 may be secured. Instead of a bellows 122, any other type of movable mechanism may be provided for actuating the pilot valve.

It is obvious that various types of installations may be accommodated by merely connecting the pilot valve with an automatically movable member or one that is actuated by hand if so desired.

Practical operation

In the operation of my air block pilot control, the float 18 on assuming a low position will cause disengagement between the cam 24 and the valve pin 70. When a liquid is discharged into the tank 10 and raises the float 18 to a predetermined position, the cam 24 will coact with the lower end of the valve pin 70 and raise the valve member 50 from its seat. This allows air to flow from the pipe 32 to the pipe 34. Such air causes the diaphragm 40 to move the valve members 42 to open position thus allowing the liquid to flow from the tank 10 and through the valve A.

When the level of liquid within the tank 10 recedes to a predetermined position, the pilot valve will be closed whereupon the air in the diaphragm chamber 36 will leak back through the passage 76 and out to atmosphere through the leak screw 78. Therefore, after the pilot valve is closed, the pressure actuated valve structure A will gradually close and the time of its closing may be regulated by adjusting the leak screw 78.

It will be noted that two cams 24 and 26 are formed on the fitting 20 and that their surfaces are oppositely inclined. This is so that in the event an installation is to be made where the valve structure A is to be opened, when the float 18 lowers, the fitting 20 may be turned over so that the cam 26 coacts with the valve 70. This is a desirable feature so that separate members will not have to be provided for the two different types of installations.

In Figure 6, the cam members are mounted outside of the casing 14 so that a packing does not have to be provided for the pin 70. The same is true of the modification shown in Figure 8.

Figures 10 and 11 illustrate a device wherein a very small packing arrangement may be used on the rotatable stem 116. Such an installation prevents the side thrust encountered by the coaction of the cam with the slidably mounted pin 70.

It will be obvious that my air block pilot control can be actuated by any desired means and may be used for controlling either a pressure actuated valve or any other type of device which may be actuated by compressed air, steam or any gas or liquid under pressure.

The operation of the valve may be instantaneously determined by referring to the gauges 84 and 86. The gauge 86 will indicate when air is being fed to the diaphragm chamber 36 and also will indicate when air is leaking therefrom.

In Figure 1, I have illustrated my device in connection with the valve A having inverted valve members. Where it is desirable for the pressure controlled by the air block pilot control to close the valve A instead of open it, the valve members 42 are mounted in an upright position or reversed relative to the showing of them in Figure 1. Such an installation would be desirable where it is necessary to control the inflow of liquid to the tank 10, depending on the level of the liquid therein.

Some changes may be made in the construction and arrangement of the parts of my device without departing from the real spirit and purpose of my invention and it is my intention to cover by my claims, any modified forms of structure or use of mechanical equivalents, which may be reasonably included within their scope.

I claim as my invention:

1. In combination with a float cage, a float therein and a pressure actuated valve structure, mechanism for controlling said valve structure depending on the position of the float comprising a casing mounted on said float cage, an air block pilot valve therein comprising a body portion, a valve member therein, means for supplying gas under pressure to one side of said valve member, means of communication between the other side thereof and said pressure actuated valve structure, a cam operated by said float and adapted to move said valve member and a gauge for indicating the pressure of gas supplied to said air block pilot valve and a gauge connected with the means of communication between the pilot valve and the pressure actuated valve for indicating the operation of the pilot valve.

2. In combination with a float cage, a float therein and a pressure actuated valve structure having a pressure chamber into which gas under pressure may be introduced for actuating said structure, mechanism for controlling said valve structure depending on the position of the float comprising a casing, an air block pilot valve therein comprising a body portion, a valve member therein, means for supplying gas under pressure to one side of said valve member, means of communication between the other side thereof, an arm on said float, a pivot shaft for said arm, said pressure chamber of the pressure actuated valve structure and a cam connected with said arm and adapted to move said valve member.

3. In combination with a float cage, a float therein and a pressure actuated valve structure having a pressure chamber to which fluid pressure may be supplied for actuating said structure, mechanism for controlling said valve structure depending on the position of the float comprising a casing, an air block pilot valve therein comprising a body portion, a valve member therein, a valve stem on said valve member, means for supplying fluid pressure to one side of said valve member, means of communication between the other side thereof and said pressure chamber of the pressure actuated valve structure and means, operable from said float for actuating said pilot valve, said means comprising a cam having an inclined cam surface coacting with one end of said valve stem.

4. An air block pilot valve comprising a body portion, a valve seat therein, a valve member engageable with said valve seat, an inlet port and an outlet port in said body portion, said valve member serving to control the flow of a gas from one of said ports to the other and a leak hole in continuous communication with one of said ports and discharging to atmosphere.

5. In combination with a float cage, a float therein and a pressure actuated valve structure, mechanism for controlling said valve structure depending on the position of the float comprising a body portion, a valve seat therein, a valve member engageable with said valve seat, an inlet portion and an outlet port in said body portion, said valve member serving to control the flow of a gas from one of said ports to the other and a leak hole in continuous communication with one of said ports and discharging to atmosphere.

6. In combination with a float cage, a float therein and a pressure actuated valve structure, mechanism for controlling said valve structure depending on the position of the float comprising a body portion, a valve seat therein, a valve member engageable with said valve seat, an inlet port and an outlet port in said body portion, said valve member serving to control the flow of a gas from one of said ports to the other and a leak hole in continuous communication with one of said ports and discharging to atmosphere, means for supplying gas under pressure to one side of said valve member, means of communication between the other side thereof and said pressure actuated valve structure and a cam operated by said float and adapted to move said valve member.

Des Moines, Iowa, January 16, 1929.

LYLE W. BROWNE.